(12) United States Patent
Chung

(10) Patent No.: US 12,430,419 B2
(45) Date of Patent: Sep. 30, 2025

(54) METHOD AND SYSTEM FOR WRITING AUTHENTICATION INFORMATION

(71) Applicant: REALTEK SEMICONDUCTOR CORP., Hsinchu (TW)

(72) Inventor: Hsin-Chia Chung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 97 days.

(21) Appl. No.: 18/419,484

(22) Filed: Jan. 22, 2024

(65) Prior Publication Data

US 2025/0045373 A1    Feb. 6, 2025

(30) Foreign Application Priority Data

Jul. 31, 2023   (TW) ................... 112128562

(51) Int. Cl.
G06F 21/44    (2013.01)

(52) U.S. Cl.
CPC .................. *G06F 21/44* (2013.01)

(58) Field of Classification Search
CPC ...................................... G06F 21/44
See application file for complete search history.

(56) References Cited

U.S. PATENT DOCUMENTS

| | | | |
|---|---|---|---|
| 11,238,159 B1* | 2/2022 | Clark-Lindh | G06F 21/572 |
| 2006/0090084 A1* | 4/2006 | Buer | G06F 21/53 |
| | | | 713/189 |
| 2008/0028235 A1* | 1/2008 | Smith | G06F 21/575 |
| | | | 713/190 |
| 2008/0189539 A1* | 8/2008 | Hsu | G06F 21/575 |
| | | | 713/2 |
| 2009/0222896 A1* | 9/2009 | Ichikawa | G06F 21/31 |
| | | | 713/1 |
| 2011/0138164 A1* | 6/2011 | Cha | G06F 9/4406 |
| | | | 713/2 |
| 2014/0359268 A1* | 12/2014 | Jauhiainen | G06F 21/44 |
| | | | 713/168 |
| 2017/0090909 A1* | 3/2017 | Guo | G06F 8/66 |
| 2022/0191033 A1* | 6/2022 | Chen | H04L 9/3278 |

* cited by examiner

*Primary Examiner* — Simon P Kanaan
(74) *Attorney, Agent, or Firm* — Li & Cai Intellectual Property Office

(57) ABSTRACT

A method and a system for writing authentication information are provided. The method is applicable to a system-on-chip (SoC) and includes configuring a processor to perform: writing predetermined authentication information into an overlay data register (ODR); executing a boot process, reading the ODR according to a secure attribute table stored in a read-only memory to obtain to-be-verified authentication information corresponding to the predetermined authentication information used to replace authentication information predetermined to be read from a one-time programmable (OTP) memory; executing a security verification process of the boot process on the to-be-verified authentication information to determine whether or not the to-be-verified authentication information passes a security verification; and in response to determining that the to-be-verified authentication information passes the security verification, writing the to-be-verified authentication information into the OTP memory to serve as the authentication information.

18 Claims, 3 Drawing Sheets

METHOD AND SYSTEM FOR WRITING AUTHENTICATION INFORMATION

CROSS-REFERENCE TO RELATED PATENT APPLICATION

This application claims the benefit of priority to Taiwan Patent Application No. 112128562, filed on Jul. 31, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a writing method and a writing system, and more particularly to a method and a system for writing authentication information.

BACKGROUND OF THE DISCLOSURE

In recent years, a growing number of malicious programs targeting firmware have caused organizations to focus more on information security. In particular, a hardware-combined "secure boot" scheme has drawn lots of attention. The so-called "secure boot" scheme refers to a process that performs before a boot process continues, and in such a process a system must first perform an authentication according to hardware settings before any other programs are run.

During the authentication, the hardware must implement the authentication according to a read-only key or security certificate data stored in a one-time programmable (OTP) memory. Such verification mechanism provided by the "secure boot" can block programs that have not been signed and verified, thereby preventing firmware from being attacked and ensuring that the boot process uses a boot program matching that of the hardware manufacturer.

However, during a development of the above architecture, since any content written into the OTP memory cannot be changed, if wrong information is written into memory, the chip will be damaged and can no longer be used. This puts the manufacturer at risk of increasing production costs.

SUMMARY OF THE DISCLOSURE

In response to the above-referenced technical inadequacies, the present disclosure provides a method and a system for writing authentication information capable of improving a data writing process for a one-time programmable (OTP) memory in a system-on-chip (SoC) and reducing development costs.

In order to solve the above-mentioned problems, one of the technical aspects adopted by the present disclosure is to provide a method for writing authentication information, applicable to a system-on-chip (SoC), and the method includes: configuring a processor to perform: writing predetermined authentication information into an overlay data register (ODR); executing a boot process, reading the ODR according to a secure attribute table stored in a read-only memory in the boot process to obtain to-be-verified authentication information corresponding to the predetermined authentication information, wherein the to-be-verified authentication information is used to replace authentication information predetermined to be read from a one-time programmable (OTP) memory in the boot process; executing a security verification process of the boot process on the to-be-verified authentication information to determine whether or not the to-be-verified authentication information passes a security verification; and in response to determining that the to-be-verified authentication information passes the security verification, writing the to-be-verified authentication information into the OTP memory to serve as the authentication information.

In order to solve the above-mentioned problems, another one of the technical aspects adopted by the present disclosure is to provide a system for writing authentication information, and the system includes: a system-on-chip (SoC) including a read-only memory storing a boot process and a secure attribute table, an overlay data register (ODR), a one-time programmable (OTP) memory predetermined for storing authentication information and a processor electrically connected to the read-only memory, the ODR and the OTP memory. The processor is configured to perform: writing predetermined authentication information into the ODR; executing the boot process, reading the ODR according to the secure attribute table in the boot process to obtain to-be-verified authentication information corresponding to the predetermined authentication information, wherein the to-be-verified authentication information is used to replace authentication information predetermined to be read from the OTP memory in the boot process; executing a security verification process of the boot process on the to-be-verified authentication information to determine whether or not the to-be-verified authentication information passes a security verification; and in response to determining that the to-be-verified authentication information passes the security verification, writing the to-be-verified authentication information into the OTP memory to serve as the authentication information.

Therefore, in the method and system for writing authentication information provided by the present disclosure, a verification process can be simulated in advance for the authentication information stored in a register during a development stage, and the content of the register is formally written into the OTP memory after completing the verification of the authentication information, thereby reducing the risk of writing erroneous information and increasing development costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
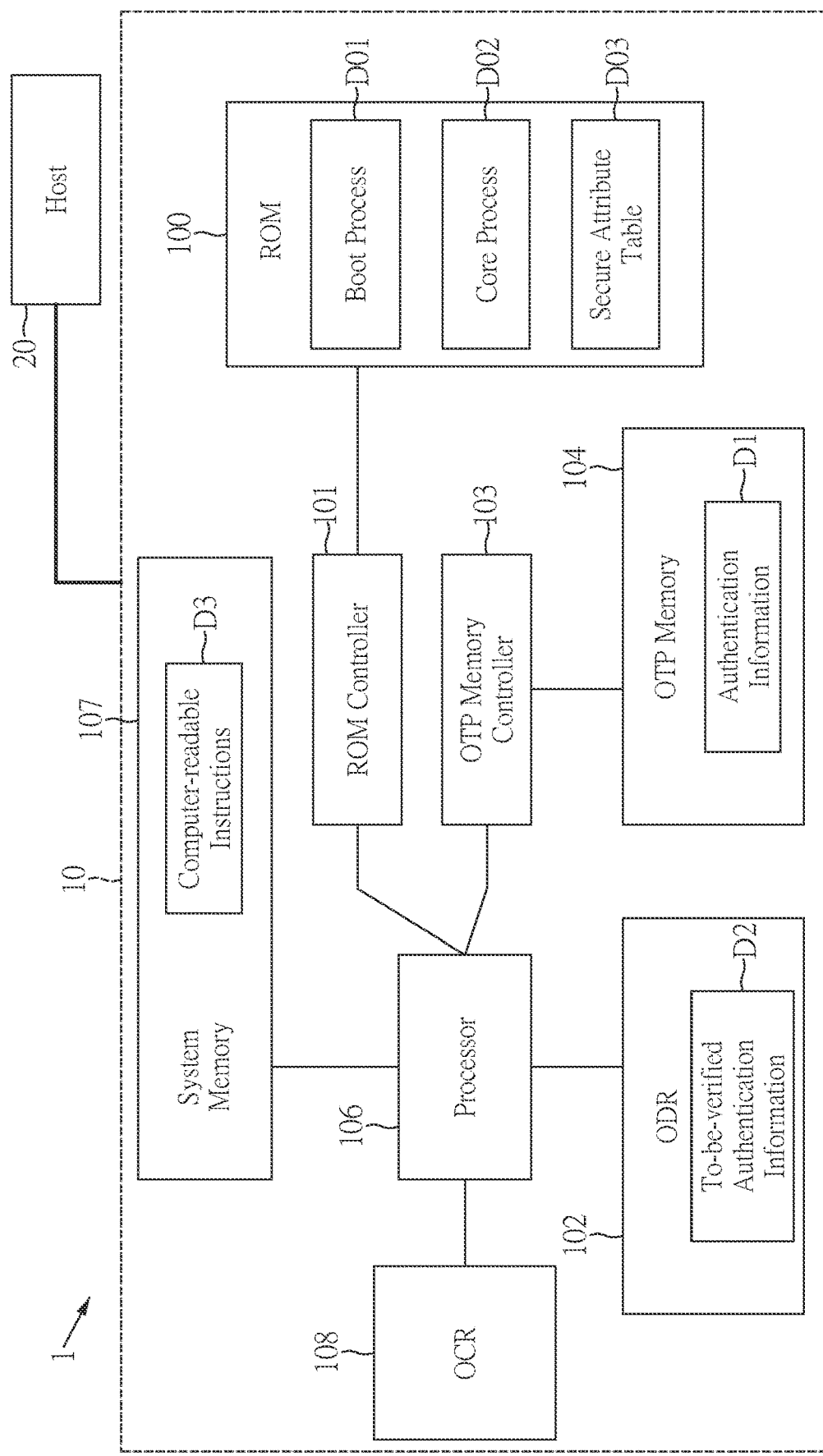
FIG. 1 is a functional block diagram of a system for writing authentication data according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1, one embodiment of the present disclosure provides a system 1 for writing authentication information, and the system 1 includes a system-on-chip (SoC) 10.

The SoC 10 generally integrates many components into a single device, including a read-only memory (ROM) 100, an overlay data register (ODR) 102, a one-time programmable (OTP) memory 104 and a processor 106.

A host 20 can be connected to the SoC 10 through an input/output (I/O) interface. The host 20 can be, for example, a consumer electronic, such as a mobile phone, a tablet device, a laptop computer, or a desktop computer. The host 20 can include a central processing unit (CPU) and a computer-readable storage medium for storing host data of the host 20. The computer-readable storage medium is, for example, a random access memory (RAM), a static RAM (SRAM), a dynamic RAM (DRAM), a non-volatile RAM (NVRAM), a ROM, a flash memory, or the like. The host data can include an operating system and multiple applications.

The operating system generally manages hardware and software resources of the host 20 and provides common services for the applications. The operating system and the applications are generally executable by the SoC 10 to enable communications with the host and user interactions.

As shown in FIG. 1, the processor 106 can be directly or indirectly electrically connected to the ROM 100, the ODR 102 and the OTP memory 104. The ROM 100 can be, for example, a flash memory, and the processor 106 can be connected to the ROM 101 through a ROM controller 101 to access data stored in the ROM 100, such as a boot process D01, a core process D02, and a secure attribute table D03.

For security considerations, an OTP memory 104 is provided in the SoC 10, and the processor 106 can be connected to the OTP memory 104 through the OTP memory controller 103 to access data stored in the OTP memory 104. Since the OTP memory 104 has a property of being tamper-resistant, it can be used to store a firmware of the SoC 10 and related authentication information D1. In the existing SoC 10 architecture, authentication information D1 including security certificates, root keys (RK), hardware unique keys (HUK) can be written into the OTP memory 104 during the development stage. Since the written information cannot be modified, the security of the authentication information D1 can be guaranteed.

In addition, in the existing boot flow, after the SoC 10 is initialized, the processor 106 can read the authentication information D1 in the OTP memory 104 to confirm whether it exists. If the authentication information D1 exists in the OTP memory 104, a boot software can be loaded after the authentication information D1 passes the verification, and a subsequent security boot process can then be completed.

However, the above-mentioned existing architecture has certain risks for developers. For example, if erroneous information is written during a development of the above architecture, the chip will be damaged and cannot be used anymore.

Therefore, the authentication information writing system 1 provided by the present disclosure can improve the existing writing process for the OTP memory.

Figure 2:
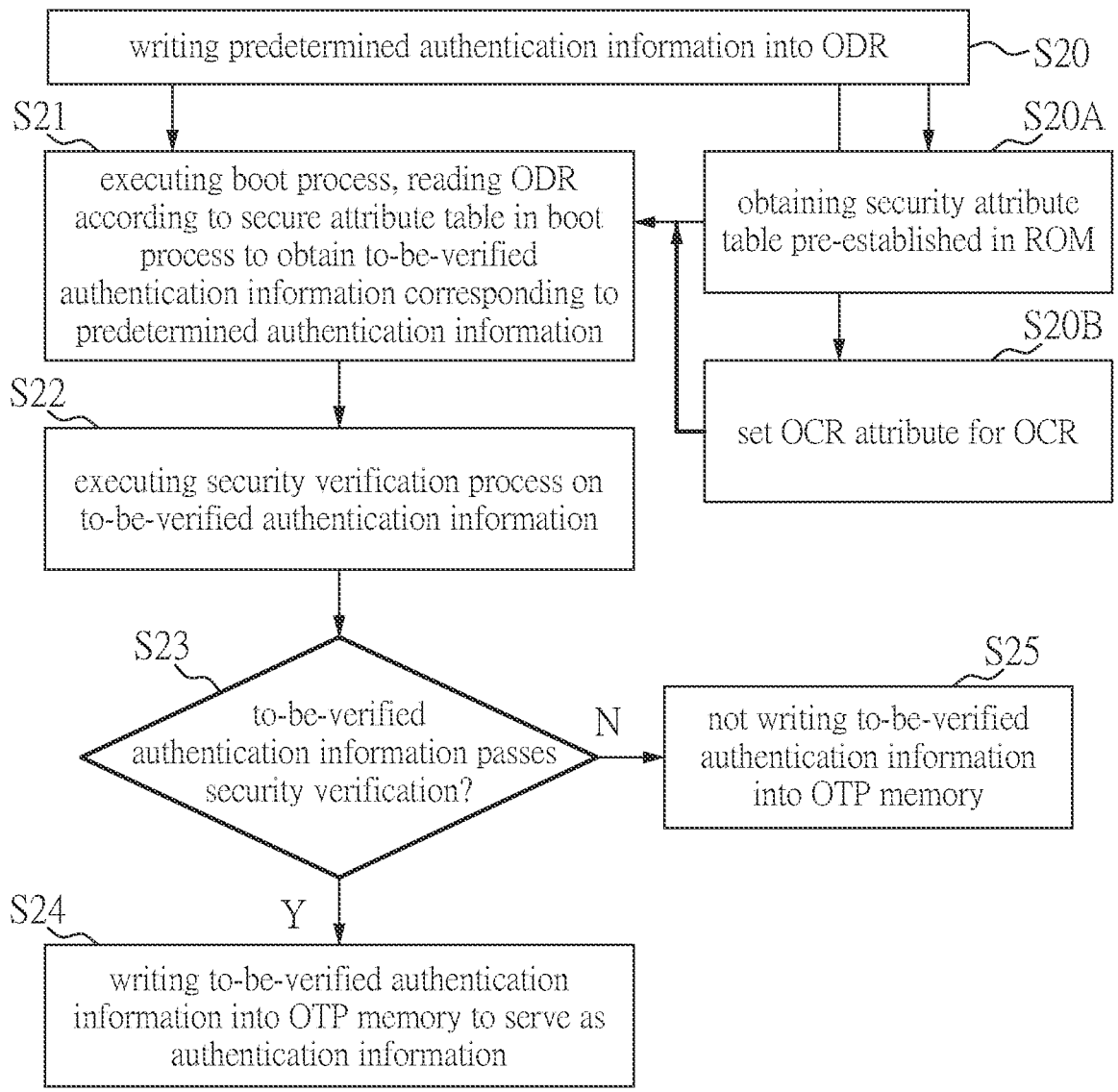
FIG. 2 is a flowchart of a method for writing authentication data according to one embodiment of the present disclosure.

Reference is made to FIG. 2, which is a flowchart of a method for writing authentication data according to one embodiment of the present disclosure.

One embodiment of the present disclosure provides a method for writing authentication data, which is applicable to the SoC 10 in FIG. 1, and the SoC 10 also includes a system memory 107, and the processor 106 can implement the above-mentioned method for writing the authentication data by executing a plurality of computer-readable instructions D3 stored therein. In addition, the method for writing the authentication information is assisted by the ODR 102 and the security attribute table D03, which will be described in detail below.

As shown in FIG. 2, the method for writing authentication information can include configuring the processor 106 to perform the following steps:

Step S20: writing predetermined authentication information into the ODR. In the development stage, prepared predetermined authentication information can be written into the ODR 102 first, and contents of the ODR 102 are retained while the SoC 10 remains powered. It should be noted that, although FIG. 1 shows that the authentication information D1 is stored in the OTP memory 104, this only means that the OTP memory 104 is predetermined to be used to store the authentication information D1, and the OTP memory 104 is in a state of not being written any information when step S20 is performed. The so-called predetermined authentication information includes firmware, security certificates, RK, HUK and other data that are predetermined to be written into the OTP memory 104.

It should be noted that step S20A needs to be performed in conjunction with step S21 to obtain the security attribute table D03 pre-established in the ROM 100. In step S20A, the security attribute table D03 defines a security attribute field for allowing contents of the ODR 102 to temporarily replace the authentication information of the OTP memory 104. The security attribute table D03 can include the following information:

1. A security attribute code SATattr, which is used to indicate an authentication information type of the predetermined authentication information, such as RK and HUK. A value of the security attribute code SATattr being 0 represents that the security attribute code SATattr is not functional, the RK corresponds to "SATattr=1", and the HUK corresponds to "SATattr=2."
2. A starting position parameter SATstart, which used to indicate a starting position of the predetermined authentication information in the OTP memory 104, and corresponds to the aforementioned authentication information type, and uses bit as a unit. For example, when the predetermined authentication information is RK and its start position is at bit 0, then "SATstart=0". When the predetermined authentication information is HUK and its start position is at bit 1024, then "SATstart=1024."
3. A length parameter SATlen, which is used to indicate a data length of the predetermined authentication information in the OTP memory 104, and a unit can be in bits. For example, when the predetermined authentication information is RK and its length is 256 bits, then "SATlen=256." When the predetermined authentication information is HUK and its length is 24 bits, then "SATlen=24."

Therefore, in step S20, the predetermined authentication information can be stored in the ODR 102 according to the corresponding length parameter. For example, if the RK is determined to be written into the ODR 102, and the length parameter of RK is 256 bits, then information of 256 bits is assigned to positions from ODR0[31:0] to ODR7[31:0] in the ODR 102. For the HK whose length parameter is 24 bits, information of 24 bits is then assigned to positions ODR0 [23:0].

In addition, reference can be made to FIG. 1. The SoC 10 further includes an overlay configuration register (OCR) 108. The OCR 108 can store an OCR attribute OCRattr, which is used to indicate an authentication information type corresponding to the predetermined authentication information. More precisely, the OCR attribute OCRattr is used to designate which security attribute the content written by the ODR 102 is used to simulate, and the OCR attribute OCRattr can be defined in the same way that the security attribute SATattr is defined. For example, if information written into the ODR 102 is the RK of 256 bits, "OCRattr=OCR[15:0]=1" is set; if information written into the ODR 102 is the HUK of 24 bits, "OCRattr=OCR[15:0]=2" is set.

Therefore, as shown in FIG. 2, when the predetermined authentication information is written into the ODR in step S20, step S20B can be performed to set the OCR attribute for the OCR.

Step S21: executing the boot process, reading the ODR according to the secure attribute table in the boot process to obtain to-be-verified authentication information corresponding to the predetermined authentication information. In step S21, the boot process is a warm reboot process, and the SoC 10 remains powered during the warm reboot process, which ensures that the contents of the ODR 102 and the OCR 108 are retained in the SoC 10. When the SoC 10 remains powered, the contents of the ODR 102 and the OCR 108 will exist until the power is turned off or a software executing in the operating system issues a command to clear the register.

In detail, in the boot process of the SoC 10, the authentication information D1 stored in the OTP memory 104 is generally verified, and the to-be-verified authentication information D2 in step S21 is used to replace the authentication information D1 predetermined to be read from the OTP memory 104 in the boot process.

Step S22: executing a security verification process on to-be-verified authentication information.

Step S23: determining whether or not the to-be-verified authentication information passes a security verification.

In response to determining that the to-be-verified authentication information passes the security verification in step S23, the method for writing authentication information proceeds to step S24: writing the to-be-verified authentication information into the OTP memory to serve as the authentication information. At the same time, the boot process continues. In this step, since the to-be-verified authentication information D2 is only used to temporarily replace the authentication information D1, the verification process is simulated in advance. After completing the security verification, the operating system of the host 20 can send a special instruction, for example, a security monitor call (SMC) sent from an advanced RISC machines (ARM) processor of the host 20, and the processor 106 can send the contents of the ODR 102 (that is, the to-be-verified authentication information D2 verified) to be formally written into the OTP memory 104 to serve as the authentication information D1.

In response to determining that the to-be-verified authentication information D2 fails to pass the security verification in step S23, the method for writing authentication information proceeds to step S25: not writing the to-be-verified authentication information into the OTP memory.

Therefore, by executing the method for writing authentication information, the verification process can be simulated in advance for the authentication information stored in the register during a development stage, and the contents of the register can be formally written into the OTP memory after completing the verification of the authentication information, thereby reducing the risk of writing erroneous information and increasing development costs.

Figure 3:
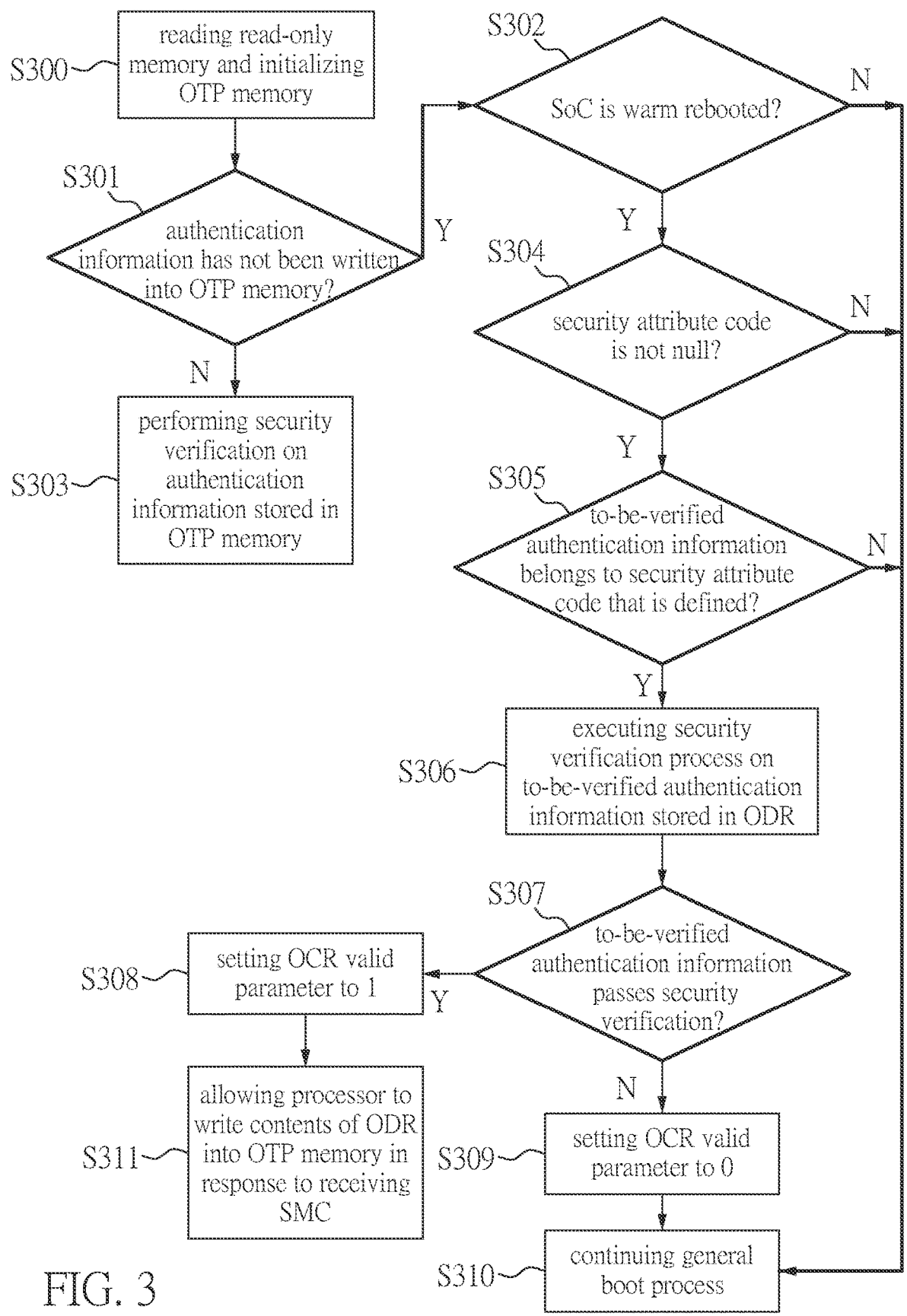
FIG. 3 is a flowchart showing the method for writing authentication information being practically applied to a boot process according to one embodiment of the present disclosure.

Reference is made to FIG. 3, which is a flowchart showing the method for writing authentication information being practically applied to a boot process according to one embodiment of the present disclosure.

As shown in FIG. 3, the boot process includes configuring the processor 106 to perform the following steps:

Step S300: reading the read-only memory and initializing the OTP memory.

Step S301: determining whether or not authentication information has not been written into the OTP memory.

If affirmative, the method proceeds to step S302: determining whether or not the SoC is warm rebooted.

If negative, the method proceeds to step S303: performing a security verification on the authentication information stored in the OTP memory. Afterwards, a general boot process continues after the authentication information passes the security verification. If the authentication information fails the security verification, the boot process is terminated.

In response to determining that the SoC has been warm rebooted in step S302, the method proceeds to step S304: determining whether or not the security attribute code is not null.

In response to determining that the SoC security attribute code is not null in step S304, the method proceeds to step S305: determining whether or not the to-be-verified authentication information belongs to the security attribute code that is defined.

In response to determining that the to-be-verified authentication information belongs to the security attribute code that is defined in step S305, the method proceeds to step S306: executing a security verification process on the to-be-verified authentication information stored in the ODR. For example, after the ODR 102 is read according to the security attribute table D03 stored in the ROM 100, the security verification process is performed on the to-be-verified authentication information written in positions from ODR0 to ODRn.

Step S307: determining whether or not the to-be-verified authentication information passes a security verification.

It should be noted that the OCR 108 can further store an OCR valid parameter. The OCR valid parameter can indicate whether or not to allow the to-be-verified authentication information D2 to be written into the OTP memory 102 when the to-be-verified authentication information D2 passes or fails to pass the security verification.

Therefore, in response to determining that the to-be-verified authentication information D2 passes the security verification in step S307, the method proceeds to step S308: setting the OCR valid parameter to 1 to indicate that the to-be-verified authentication information D2 is allowed to be written into the OTP memory 102.

In response to determining that the to-be-verified authentication information D2 fails to pass the security verification in step S307, the method proceeds to step S309: setting the OCR valid parameter to 0 to indicate that the to-be-verified authentication information D2 is not allowed to be written into the OTP memory 102.

In addition, in response to determining that the SoC has not been warm booted in step S302, determining that the security attribute code is null in step S304, determining that the to-be-verified authentication information does not belong to the security attribute code that is defined in step S305, or after step S309 is executed, the method proceeds to step S310: continuing the general boot process.

After step S308 is executed, the method proceeds to step S311: allowing the processor to write the contents of the ODR into the OTP memory in response to receiving the special instruction, for example, the SMC sent from the ARM processor of the host.

Beneficial Effects of the Embodiments

In conclusion, in the method and system for writing authentication information provided by the present disclosure, a verification process can be simulated in advance for the authentication information stored in a register during a development stage, and the content of the register is formally written into the OTP memory after completing the verification of the authentication information, thereby reducing the risk of writing erroneous information and development costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for writing authentication information, applicable to a system-on-chip (SoC), the method comprising: configuring a processor to perform:
   writing predetermined authentication information into an overlay data register (ODR);
   executing a boot process, reading the ODR according to a secure attribute table stored in a read-only memory in the boot process to obtain to-be-verified authentication information corresponding to the predetermined authentication information, wherein the to-be-verified authentication information is used to replace authentication information predetermined to be read from a one-time programmable (OTP) memory in the boot process;
   executing a security verification process of the boot process on the to-be-verified authentication information to determine whether or not the to-be-verified authentication information passes a security verification; and
   in response to determining that the to-be-verified authentication information passes the security verification, writing the to-be-verified authentication information into the OTP memory to serve as the authentication information.

2. The method according to claim 1, further comprising: obtaining the security attribute table established in the read-only memory.

3. The method according to claim 2, wherein the security attribute table defines:
   a security attribute code used to indicate an authentication information type of the predetermined authentication information;
   a starting position parameter used to indicate a starting position of the predetermined authentication information in the OTP memory; and
   a length parameter used to indicate a data length of the predetermined authentication information in the OTP memory.

4. The method according to claim 3, wherein the predetermined authentication information is stored in the ODR according to a corresponding one of the length parameter.

5. The method according to claim 3, further comprising: setting an overlay configuration register (OCR) attribute for an OCR when writing the predetermined authentication information into the ODR, wherein the OCR attribute is used to indicate the authentication information type corresponding to the predetermined authentication information.

6. The method according to claim 5, further comprising: setting an OCR valid parameter for the OCR to indicate whether or not to allow the to-be-verified authentication information to be written into the OTP memory when the to-be-verified authentication information passes the security verification.

7. The method according to claim 1, wherein the boot process is a warm reboot process, and the SoC remains powered when the warm boot process is executed.

8. The method according to claim 3, further comprising: configuring the processor to read the ODR according to the security attribute table stored in the read-only memory in response to determining that the security attribute code is not a null value, the to-be-verified authentication information belongs to the security attribute code that is defined, and the authentication information has not been written into the OTP memory.

9. The method according to claim 1, further comprising: configuring the processor to write the to-be-verified authentication information into the OTP memory to serve as the authentication information in response to receiving a security monitor call (SMC).

10. A system for writing authentication information, the system comprising:
a system-on-chip (SoC) including:
a read-only memory storing a boot process and a secure attribute table;
an overlay data register (ODR);
a one-time programmable (OTP) memory predetermined for storing authentication information; and
a processor electrically connected to the read-only memory, the ODR and the OTP memory, wherein the processor is configured to perform:
writing predetermined authentication information into the ODR;
executing the boot process, reading the ODR according to the secure attribute table in the boot process to obtain to-be-verified authentication information corresponding to the predetermined authentication information, wherein the to-be-verified authentication information is used to replace authentication information predetermined to be read from the OTP memory in the boot process;
executing a security verification process of the boot process on the to-be-verified authentication information to determine whether or not the to-be-verified authentication information passes a security verification; and
in response to determining that the to-be-verified authentication information passes the security verification, writing the to-be-verified authentication information into the OTP memory to serve as the authentication information.

11. The system according to claim 10, wherein the security attribute table is established in the read-only memory.

12. The system according to claim 11, wherein the security attribute table defines:
a security attribute code used to indicate an authentication information type of the predetermined authentication information;
a starting position parameter used to indicate a starting position of the predetermined authentication information in the OTP memory; and
a length parameter used to indicate a data length of the predetermined authentication information in the OTP memory.

13. The system according to claim 12, wherein the predetermined authentication information is stored in the ODR according to a corresponding one of the length parameter.

14. The system according to claim 3, further comprising an overlay configuration register (OCR), wherein the processor is further configured to set an OCR attribute for the OCR when writing the predetermined authentication information into the ODR, wherein the OCR attribute is used to indicate the authentication information type corresponding to the predetermined authentication information.

15. The system according to claim 14, wherein the processor is further configured to set an OCR valid parameter for the OCR to indicate whether or not to allow the to-be-verified authentication information to be written into the OTP memory when the to-be-verified authentication information passes the security verification.

16. The system according to claim 10, wherein the boot process is a warm reboot process, and the SoC remains powered when the warm boot process is executed.

17. The system according to claim 12, wherein the processor is further configured to read the ODR according to the security attribute table stored in the read-only memory in response to determining that the security attribute code is not a null value, the to-be-verified authentication information belongs to the security attribute code that is defined, and the authentication information has not been written into the OTP memory.

18. The system according to claim 10, wherein the SoC is electrically connected to a host, and the processor is further configured to write the to-be-verified authentication information into the OTP memory to serve as the authentication information in response to receiving a security monitor call (SMC).

* * * * *